US009230338B2

(12) United States Patent
Kunkel et al.

(10) Patent No.: US 9,230,338 B2
(45) Date of Patent: Jan. 5, 2016

(54) GRAPHICS BLENDING FOR HIGH DYNAMIC RANGE VIDEO

(71) Applicant: Dolby Laboratories Licensing Corporation, San Francisco, CA (US)

(72) Inventors: Timo Kunkel, Oakland, CA (US); Robin Atkins, Campbell, CA (US); Tao Chen, Palo Alto, CA (US); Samir N. Hulyalkar, Los Gatos, CA (US); Jaclyn Anne Pytlarz, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/631,950

(22) Filed: Feb. 26, 2015

(65) Prior Publication Data
US 2015/0256860 A1    Sep. 10, 2015

Related U.S. Application Data

(60) Provisional application No. 62/102,276, filed on Jan. 12, 2015, provisional application No. 61/948,413, filed on Mar. 5, 2014.

(51) Int. Cl.
*H04N 9/76* (2006.01)
*G06T 7/40* (2006.01)
*G06T 5/00* (2006.01)
*G06T 11/60* (2006.01)
*H04N 5/445* (2011.01)
*H04N 21/426* (2011.01)

(52) U.S. Cl.
CPC . *G06T 7/408* (2013.01); *G06T 5/00* (2013.01); *G06T 11/60* (2013.01); *H04N 5/44504* (2013.01); *H04N 21/42653* (2013.01)

(58) Field of Classification Search
CPC .................... H04N 21/42653; H04N 5/44504; G06T 11/60
USPC ................. 348/598, 597, 589, 584, 600, 441; 345/619, 629, 630
See application file for complete search history.

(56) References Cited

U.S. PATENT DOCUMENTS

| 8,593,480 B1 | 11/2013 | Ballestad | |
| 2015/0156469 A1* | 6/2015 | Qu | H04N 9/8715 348/43 |
| 2015/0245004 A1* | 8/2015 | Guo | H04N 11/20 348/453 |

FOREIGN PATENT DOCUMENTS

WO    2014/130343    8/2014

* cited by examiner

*Primary Examiner* — Jefferey Harold
*Assistant Examiner* — Jean W Desir
(74) *Attorney, Agent, or Firm* — Konstantinos Konstantindes

(57) ABSTRACT

A method for merging graphics and high dynamic range video data is disclosed. In a video receiver, a display management process uses metadata to map input video data from a first dynamic range into the dynamic range of available graphics data. The remapped video signal is blended with the graphics data to generate a video composite signal. An inverse display management process uses the metadata to map the video composite signal to an output video signal with the first dynamic range. To alleviate perceptual tone-mapping jumps during video scene changes, a metadata transformer transforms the metadata to transformed so that on a television (TV) receiver metadata values transition smoothly between consecutive scenes. The TV receiver receives the output video signal and the transformed metadata to generate video data mapped to the dynamic range of the TV's display.

14 Claims, 3 Drawing Sheets

GRAPHICS BLENDING FOR HIGH DYNAMIC RANGE VIDEO

CROSS REFERENCE TO RELATED APPLICATIONS

This patent application claims the benefit of priority from U.S. Provisional Patent Application Ser. No. 61/948,413, filed on Mar. 5, 2014, and U.S. Provisional Patent Application Ser. No. 62/102,276, filed on Jan. 12, 2015, each of which is incorporated herein by reference in its entirety. This patent application may also be related to PCT Patent Application Ser. No. PCT/US2014/016304, filed on Feb. 13, 2014, "Display management for high dynamic range video," which is incorporated herein by reference in its entirety.

TECHNOLOGY

The present invention relates generally to video images. More particularly, an embodiment of the present invention relates to blending graphics with high dynamic range video.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noon-day sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable by short-term adaptation though a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

Most consumer desktop displays support luminance of 200 to 300 cd/m$^2$ or nits. Most consumer HDTVs range from 300 to 1000 cd/m$^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more). In general, the methods of the present disclosure relate to any dynamic range higher than SDR.

As used herein, the term "display management" denotes the processing (e.g., tone and gamut mapping) required to map an input video signal of a first dynamic range (e.g., 1000 nits) to a display of a second dynamic range (e.g., 500 nits). Examples of display management processes are described in PCT Application Ser. No. PCT/US2014/016304 (the '304 application), filed on Feb. 13, 2014, "Display management for high dynamic range video," by R. Atkins el at., which is incorporated herein by reference in its entirety. Display management may be assisted or controlled by input metadata generated by the source of the incoming content and multiplexed into the coded bitstream.

In some use cases, incoming EDR video may also be blended by graphics of a third dynamic range (e.g., 100 nits) before being sent to the target display. As used herein, the term 'graphics' denotes any kind of imagery (e.g., menus, still pictures, vector graphics, video, and the like) that may be blended with a video signal. As appreciated by the inventors here, improved techniques for blending graphics with high dynamic range video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for blending graphics and EDR video signals of different dynamic ranges are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the blending of SDR graphics with enhanced dynamic range (EDR) video. In a video receiver, a display management process uses input content-based metadata to map input EDR video data from a first dynamic range into the dynamic range of the available graphics data. The remapped video signal is blended with the graphics data to generate a video composite signal. An inverse display management process uses the content-based metadata to map the video composite signal back to and EDR output video signal. To alleviate perceptual tone-mapping jumps during video scene changes, a metadata transformer transforms the content-based metadata to transformed content-based metadata so that on a TV receiver metadata values transition smoothly between consecutive scenes. A television (TV) receiver receives the output video signal and the transformed metadata to generate video data mapped to the dynamic range of the TV's display.

In an embodiment, all blending is performed in a perceptually-quantized color space, like IPT-PQ.

Graphics Compositing

Temporal Metadata Transformation

Existing display and play-back devices, such as HDTVs, set-top boxes, or Blu-ray players, typically support signals of up to 1080p HD resolution (e.g., 1920×1080 pixels at 60 frames per second). For consumer applications, such signals are now typically compressed using a bit-depth of 8 bits per pixel per color component. Because of the 8-bit depth and the corresponding low dynamic range, such signals are typically referred to as signals with standard dynamic range (SDR).

As new television standards are being developed, such as Ultra-High Definition (UHD), it may be desirable to encode signals with enhanced resolution and/or enhanced dynamic range while allowing legacy decoders to still be able to receive and decode a version of the same signal with lower dynamic range (e.g., SDR). Assuming an incoming coded EDR video bit stream has been properly decoded, FIG. 1A depicts an embodiment of an example implementation of a display manager processor (100) for an EDR video receiver in a digital media player, for generating an EDR output signal for a target television or display (150).

Figure 1A:
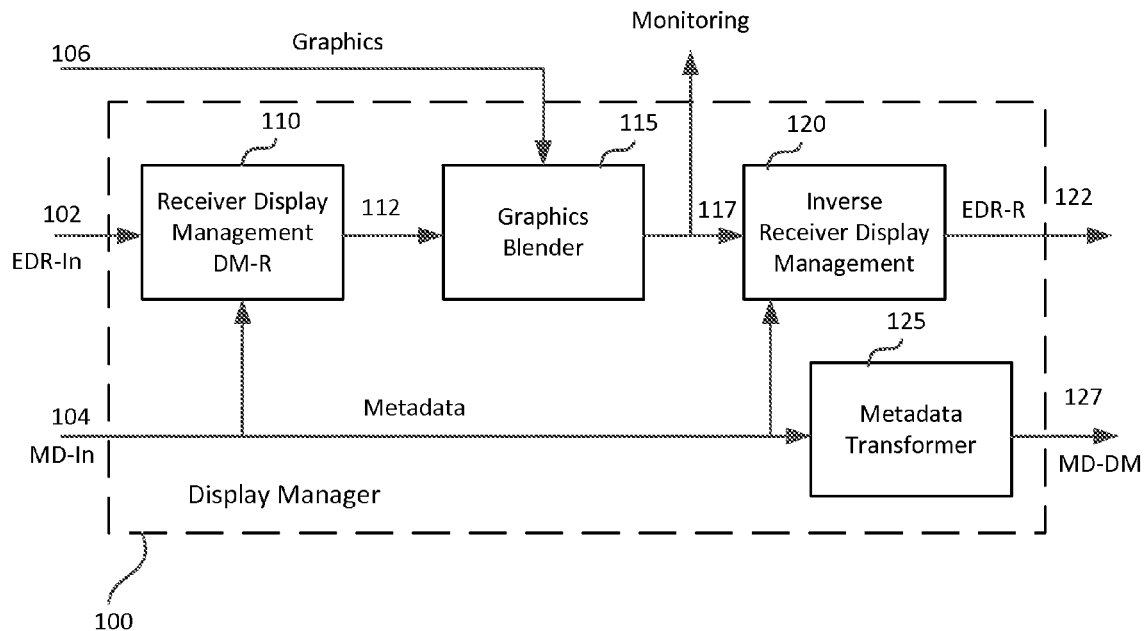
FIG. 1A and FIG. 1B depict an example implementation of a graphics compositing pipeline according to an embodiment of the present invention.
Figure 1B:
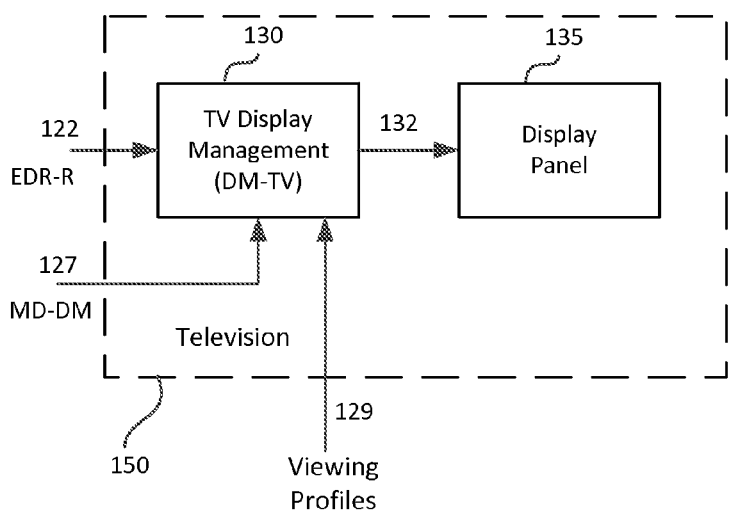

FIG. 1B depicts an embodiment of an example implementation of a television set (150) which may include its own display management processor (130) and a display panel (135). Given input EDR data (122) and metadata MD-DM (127), TV display management processor (130) adjust the luminance and color of the input data (122) to match the dynamic range and color gamut of the display panel (135). The TV display management process (130) may also be adjusted according to a TV viewing profile (129) selected by the user (e.g., 2D mode, 3D mode, movie mode, vivid mode, and the like) or other environmental parameters (e.g., ambient light).

As used herein, the term 'digital media player' denotes any device that receives digital media content (e.g., video, pictures, music, and the like) to play it back on a television, monitor, or other display. Examples of digital media players include set-top boxes, gaming machines (e.g., an Xbox), general purpose personal computers, tablets, or dedicated digital media receivers, such as the Apple TV or the Roku box.

As depicted in FIG. 1A, the display manager (100) receives EDR input (102) and optionally associated metadata (104) and graphics data (106). EDR input (102) may comprise part of a frame or a full frame of a sequence of images, such as an EDR video signal. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR image (102) may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intent.

EDR input (102) may also include source display metadata (104) related to the display used to color grade the image during program production. For example, such metadata may include the reference electro-optical transfer function (EOTF) as defined by Recommendation ITU-R BT.1866 (March 2011). The EDR input may also include additional source display and content metadata, such as the maximum and minimum brightness of the source or reference display, the maximum, minimum, and average mid-tone of the data, and the intensity of ambient light during color grading. Content metadata may be adjusted on a per frame or a per scene basis, or whenever there is a change. If there are no metadata related to the source content, then in some embodiments such data may be extracted by analyzing the source video content. As used herein, the terms 'scene' or 'shot' denote a series of sequential-in-capture frames that may share the same overall brightness characteristics. Scene cuts may also be part of the input metadata.

In some embodiments, input graphics (106) (such as menus and other overlays) may be available in a legacy color space and dynamic range (e.g., Rec. 709 at 100 nits), which is different than the color space and dynamic range of the incoming EDR input (102). To make things more complicated, the dynamic range of the graphics in the receiver (100) may also be different than the maximum dynamic range supported by the display system (135) of the TV set (150).

As depicted in FIG. 1A, in an embodiment, blending of SDR graphics with EDR input data is performed in the SDR domain. In an embodiment, the receiver's display manager processor DM-R (110) maps the incoming dynamic range (e.g., 1000 nits) to the desired graphics or compositing dynamic range (e.g., 100 nits). In a preferred embodiment, the output (112) of this process is not clipped and therefore may contain illegal display values, such as negative values or values larger than a maximum allowable threshold. This is recommended to improve the accuracy of an inverse display management process (120) that will follow.

Graphics (106) and video data (112) are blended in graphics blender (115) to generate a composite video signal (117). In an embodiment, after appropriate clipping, the composite video signal (117) may be monitored on an external display (not shown). If the display management parameters in DM-R (110), used to create the composite signal (117), are the same as the display management parameters in DM-TV (130), used to generate signal (132) for a target display panel (135), then signal (117) may be transmitted directly to the display panel (135) and processing steps (120) and (130) may be bypassed or replaced by other video processing, such as video clipping.

However, typically the DM-R and DM-TV display management processes may be in different devices (e.g., in a set-top box and a TV) or the TV may support a higher dynamic range than the dynamic range of the video receiver. In such cases, an inverse display management process (120) converts the SDR composite video signal (117) back to an EDR output signal, EDR-R (122). In a preferred embodiment, signals EDR-R (122) and EDR-In (102) have the same dynamic range; however, display manager (100) may generate output EDR-R (122) in any target dynamic range or color gamut. In an embodiment, display management processes (110), (120) and (130) may be implemented based on the tone-mapping and inverse tone-mapping methods described in the US patent with U.S. Pat. No. 8,593,480, "Method and apparatus for image data transformation," by A. Ballestad and A. Kostlin, which is incorporated herein by reference in its entirety. An example of such an implementation is described in the '304 application; however, alternative mapping techniques as known by a person of ordinary skill in the art may also be applied.

In some embodiments, because of the potential mismatch between the dynamic ranges of graphics blending and the panel range (e.g., blending at 100 nits versus displaying at 500 nits), graphics intensities and color values may 'jump' at scene cuts or even within the same scene. For example, the luminosity of a menu element may change when the background EDR video switches from one scene to another (e.g., from a bright scene to a dark scene or vice versa). Such perceptual jumps in tone-mapping (e.g., sudden changes in luminance or color) may be alleviated using, as depicted in FIG. 1A, a metadata transformer (125).

Consider again incoming EDR video signal (102) and its associated metadata MD-In (104). If there is no requirement for video compositing (e.g., blending the video with input graphics data (106)), then both video data (102) and metadata (104) may be passed to the TV with no transformation. If there is a requirement for video compositing, then in addition to the blending steps (110), (115), and (120) described earlier, a metadata transformer (125) may apply a temporal correction to the input metadata to alleviate perceptual jumps in tone-mapping changes.

Figure 2A:
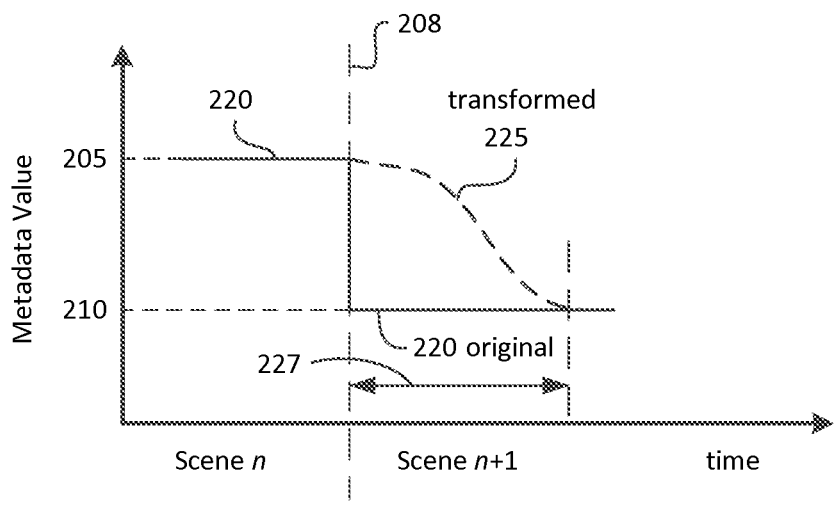
FIG. 2A and FIG. 2B depict an example metadata transformation process according to an embodiment of the present invention.

FIG. 2A depicts an example of a metadata value (220) changing between two consecutive scenes (scene n and scene n+1). For example, the metadata value (220) may be the maximum luminance value in a scene, the minimum luminance value in the scene, or any other scene-related metadata value. As depicted in FIG. 2A, without limitation, at scene cut (208), the metadata value (220) transitions from a first value (205) to a second value (210). In an embodiment, metadata transformer (125) adjusts the input metadata (104, 220) so that the transition time (227) from the first value (205) to the second value (210) is extended to be larger than zero, that is, it is not instant. In some embodiments, the transformed metadata value (e.g., 255) may represent a smoother transition from the first value to the second value. In some embodiments, metadata value transformations may also be applied at other time intervals, not necessarily associated with a scene cuts.

In an embodiment, the metadata transformer comprises a low-pass filtering function. In another embodiment, the metadata transformer comprises an exponential increasing or decreasing function (e.g., $f(x)=Axe^{bt}$, where variables A and b control the rate of increase or decrease of input x over time t). A person with ordinary skill in the art will appreciate that there are variety of other linear or non-linear functions that can be applied to generate metadata value transitions.

Regardless of the transformation function being used, only the metadata values (104) are transformed and not the video data (117 or 122) itself.

Figure 2B:
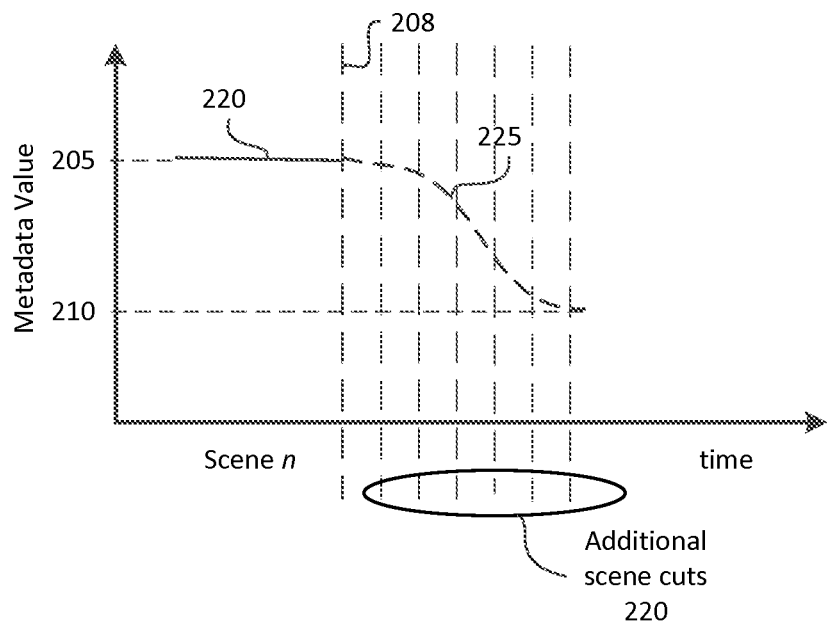

In an embodiment, as depicted in FIG. 2B, the metadata transformer may also insert markings for one or more additional scene cuts (220) between the original scene cut (208) and the time it takes for the transformed metadata value (225) to reach its end transitional value (210).

The transition interval (227) may be user defined, may depend on known human adaptation models, such as light or dark adaptation as a function of the contrast change between the two scenes, or it may be a function of any other parameter of the receiver or the display systems.

Blending in IPT-PQ Space

In a preferred embodiment, blending is performed in what will be referred to as the IPT-PQ color space; however, blending may also be performed in other color spaces, such as linear RGB, gamma RGB, YCbCr, XYZ, CIE-Lab, and the like. IPT, as described in "*Development and testing of a color space (ipt) with improved hue uniformity*", by F. Ebner and M.D. Fairchild, in Proc. 6$^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization may be based on the maximum luminance of the target display.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

An example of an EOTF based on a PQ curve is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J.

Stessen et al., ISO/IEC JTC1/SC29/WG11 MPEG2014/M35065, October 2014, which is incorporated herein by reference in its entirety.

Figure 3:
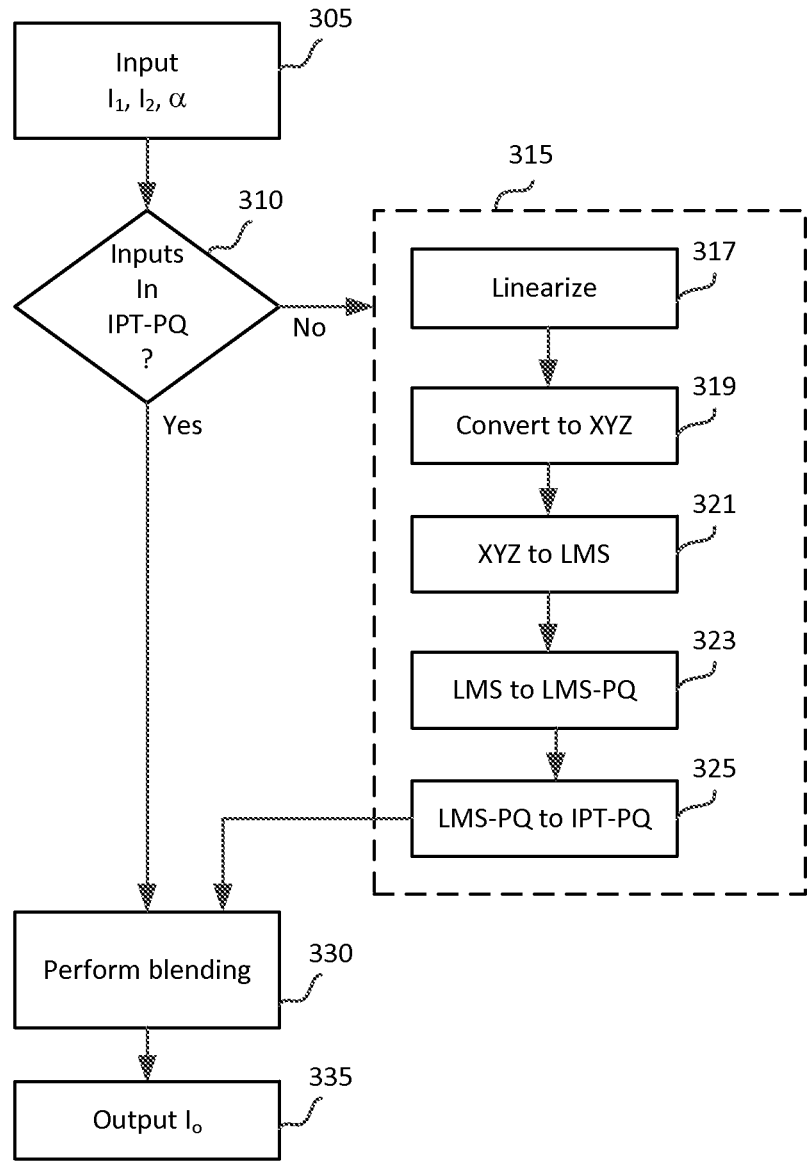
FIG. 3 depicts an example process of alpha blending according to an embodiment of the present invention.

FIG. 3 depicts an example process for performing alpha blending in an IPT-PQ color space according to an embodiment. As depicted in FIG. 3, consider inputs $I_1$ and $I_2$, and the desired alpha blend ($\alpha$) (305). If both inputs are in the IPT-PQ color space, then blending (330) may be performed directly on the two inputs to generate blended output $I_O$. For example $$I_O = \alpha I_1 + (1-\alpha) I_2.$$

In some embodiments, blending (330) may also incorporate any of the methods discussed earlier.

If any of the inputs is not in the IPT-PQ color space, then it is converted to IPT-PQ (315). Process (315) provides an example implementation process of translating an input from its original color (say, RGB gamma, RGB PQ, and the like) to the IPT-PQ color space.

In step (317), if needed, the input signal may be normalized first from its original range (e.g., 0 to 4095) into pixel values with the dynamic range between 0 to 1. Next, using the signal's EOTF or inverse EOTF (OETF) the input is linearized. For example, if the input signal is gamma coded, then this step applies an inverse gamma function. If the input signal is PQ-encoded according to SMPTE ST 2084, then this step applies an inverse PQ function. In practice, the normalization and the inverse non-linear encoding (317) steps may be performed using pre-computed 1-D Look-up tables (LUTs). This step may be skipped if the input is already in a linear color space.

Next (steps 319, 321), the input is converted to the LMS color space. This typically involves two steps: a) applying a 3×3 matrix to the linear color data to convert them to XYZ (319), followed by b) an XYZ to LMS color transformation (321).

In step (323), each LMS color component is transformed to a perceptually-coded LMS color space (LMS-PQ) by applying the desired perceptual EOTF (e.g., SMPTE ST 2084).

Finally, in step (325), using the standard LMS to IPT 3×3 linear transform, the LMS-PQ data are translated to the IPT-PQ color space.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to blending graphics with EDR video, such as those described herein. The computer and/or IC may compute any of a variety of parameters or values that relate to blending graphics with EDR video, as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to blending graphics with EDR video as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient blending of graphics with EDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a video receiver, a method for blending graphics data, the method comprising:
   receiving input graphics data at a first dynamic range;
   receiving an input video signal at a second dynamic range, wherein the second dynamic range is different than the first dynamic range;
   receiving metadata for the input video data;
   applying a receiver display management process to the input video data and the received metadata to generate a first video signal at the first dynamic range;
   blending the first video signal with the input graphics data to generate a composite video signal;
   applying an inverse display management process to the composite video signal and the metadata to generate an output video signal at a third dynamic range;
   transforming the metadata using a metadata transform function to generate transformed metadata; and
   outputting the output video signal and the transformed metadata.

2. The method of claim 1, wherein the third dynamic range is the same as the second dynamic range.

3. The method of claim 1, wherein transforming the metadata comprises:
   receiving a metadata parameter of a first value for a first scene and a second value for a second scene immediately following the first scene;

applying a transformation function to the metadata parameter so that it transitions from the first value to the second value within a transition time interval larger than zero.

4. The method of claim 3, wherein the transformation function comprises a low-pass filter function.

5. The method of claim 3, wherein the transformation function comprises an exponential function.

6. The method of claim 3, further comprising inserting one or more indications of a scene cut to the metadata during the transition period between the first value and the second value.

7. The method of claim 1, wherein the first dynamic range is a standard dynamic range and the second dynamic range is an enhanced dynamic range.

8. The method of claim 1, wherein the metadata comprises content-related metadata.

9. The method of claim 1, further comprising:
in a television set, receiving the output video signal and the transformed metadata; and
applying a TV display management process to the output video signal and the transformed metadata to generate a target display signal at a fourth dynamic range.

10. The method of claim 1, further comprising:
determining whether the first video signal and the input graphics data are in a perceptually quantized IPT color space, and if not, converting them from their original color space to the perceptually quantized IPT color space; and
performing the blending step in the perceptually quantized IPT color space.

11. The method of claim 10, wherein the IPT perceptual quantization is performed according to SMPTE ST 2084.

12. A non-transitory computer-readable storage medium having stored thereon computer-executable instruction for executing a method with a computer in accordance with claim 1.

13. An apparatus for blending graphics data, the apparatus comprising:
input means for receiving input graphics data at a first dynamic range;
input means for receiving an input video signal at a second dynamic range, wherein the second dynamic range is different than the first dynamic range;
input means for receiving metadata for the input video data;
a processor for applying a receiver display management process to the input video data and the received metadata to generate a first video signal at the first dynamic range;
a processor for blending the first video signal with the input graphics data to generate a composite video signal;
a processor for applying an inverse display management process to the composite video signal and the metadata to generate an output video signal at a third dynamic range;
a processor for transforming the metadata using a metadata transform function to generate transformed metadata; and
means for outputting the output video signal and the transformed metadata.

14. The apparatus of claim 13, further comprising:
determining whether the first video signal and the input graphics data are in a perceptually quantized IPT color space, and if not, converting them from their original color space to the perceptually quantized IPT color space; and
performing the blending step in the perceptually quantized IPT color space.

* * * * *